Sept. 18, 1962 N. KENYERES ET AL 3,054,934
PANELBOARDS
Filed Jan. 30, 1959 6 Sheets-Sheet 1

WITNESSES
INVENTORS
Nicholas Kenyeres &
Robert G. Anderson
BY
ATTORNEY

Sept. 18, 1962     N. KENYERES ET AL     3,054,934
PANELBOARDS

Filed Jan. 30, 1959     6 Sheets—Sheet 4

Sept. 18, 1962   N. KENYERES ET AL   3,054,934
PANELBOARDS
Filed Jan. 30, 1959   6 Sheets-Sheet 6

United States Patent Office 3,054,934
Patented Sept. 18, 1962

3,054,934
PANELBOARDS
Nicholas Kenyeres, Toronto, Ontario, and Robert G. Anderson, Streetsville, Ontario, Canada, assignors to Canadian Westinghouse Company, Limited, Hamilton, Ontario, Canada
Filed Jan. 30, 1959, Ser. No. 790,239
12 Claims. (Cl. 317—119)

This invention relates, generally, to panelboards and, more particularly, to panelboards having a plurality of circuit interrupter units mounted inside a cabinet.

For various reasons, it is desirable that panelboards be relatively compact in structure. However, the dissipation of heat in such panelboards is a problem. One of the major sources of heat is contact surfaces. Therefore, it is desirable that the number of contact surfaces in a panelboard be kept at a minimum. Also, in the interest of economy, it is desirable that many parts of a panelboard assembly be substantially identical.

An object of the invention is to provide power conductors having integrally formed contact portions for connecting to circuit interrupters in a panelboard.

Another object of the invention is to provide two power conductors which are of substantially identical shape and may be blanked from a single piece of material such as sheet copper.

A further object of the invention is to provide insulating support members which support power conductors and interrupter units in the panelboard and which may be joined end-to-end to permit the mounting of any number of interrupter units.

Still another object of the invention is to provide insulating support members which may be utilized to mount the interrupter units in two parallel rows or in a single row in the panelboard.

A still further object of the invention is to provide for mounting interrupter units either of the plug-in type or of the screw-connected type in the panelboard.

Another object of the invention is to provide a resiliently mounted base for the interrupter units which may be adjusted in the enclosing cabinet with the interrupter units in position on the base.

Other objects of the invention will be explained fully hereinafter or will be apparent to those skilled in the art.

In accordance with one embodiment of the invention, a sheet metal base or pan is movably mounted on four pillars or studs attached to the back wall of a cabinet. The base is resiliently supported by springs disposed on the pillars between the base and the back wall of the cabinet. A plurality of circuit interrupter units are mounted on a metal support attached to the base and a row of insulating supports centrally disposed on the base in end-to-end relation. Insulating cross members overlie adjacent ends of the center supports and are attached to the base, thereby retaining the center supports in position. Two parallel bus bars are mounted on the cross members and have transverse arms which terminate over the center supports with upwardly extending contact portions. A third bus bar is disposed underneath the center supports and attached to the supports by screws which extend through angle-shaped contact portions and the center supports into the bus bar. The circuit interrupters have contact members which engage the contact portions on the bus bars.

For a better understanding of the nature and objects of the invention, reference may be had to the following detailed description, taken in conjunction with the accompanying drawings, in which.

Figure 1:
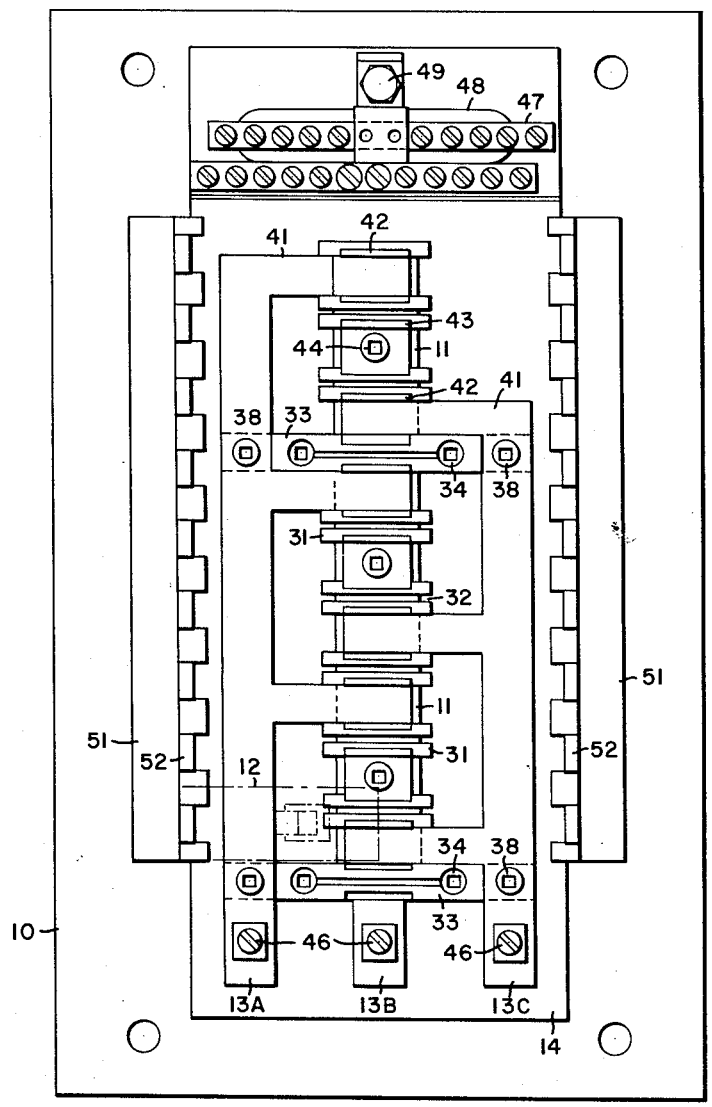
FIGURE 1 is a view, in plan, of a portion of a panelboard structure embodying the principal features of the invention.
Figure 4:
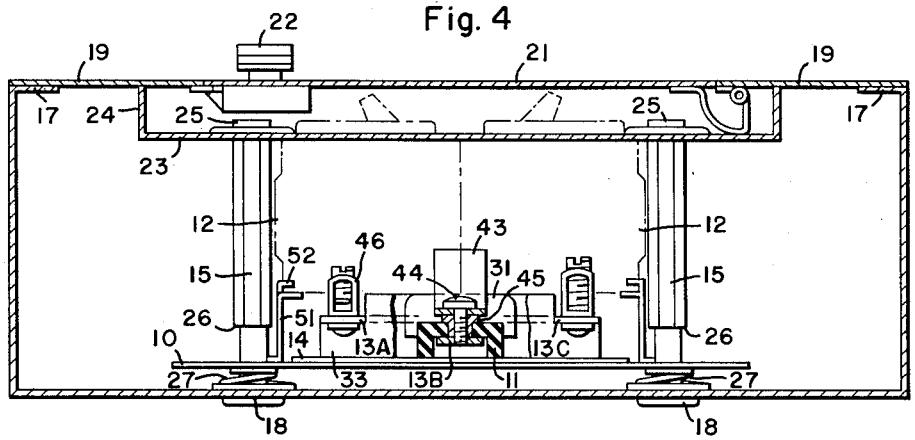
FIGS. 4, 5 and 6 are views, partly in section and partly in elevation, of the structures shown in FIGS. 1, 2 and 3, respectively.

Referring to the drawings, and particularly to FIGS. 1 and 4, the structure shown therein comprises a mounting plate or pan 10, a plurality of center insulating supports 11 upon which may be mounted a plurality of circuit interrupter units 12, and a plurality of bus bars 13A, 13B and 13C for conducting current to the interrupter units 12. The interrupter units 12 may be automatic circuit breakers, preferably of the plug-in type. However, circuit breakers of other types may be utilized if desired, as will be explained more fully hereinafter.

As shown more clearly in FIG. 4, the mounting pan 10 may be a flat plate or sheet of metal. A sheet of insulating paper 14 is disposed between the plate 10 and the insulating supports 11. The plate 10 is movably mounted on studs or pillars 15 which are attached to the back wall of a cabinet 16 having integrally formed side walls with inturned flanges 17 thereon. The lower ends of the pillars 15 may be threaded into nuts 18 secured to the back wall of the cabinet 16. A panel trim or cover 19 may be attached to the flanges 17 by screws or other fastening means (not shown). A door 21 may be hinged to the trim 19. The door may be fastened in the closed position by a latch 22.

As shown in FIG. 4, a shield 23 having an upturned flange 24 is mounted on top of the pillars 15. The shield 23 is adjustably retained on the pillars 15 by screws 25 which are threaded into the tops of the pillars 15. The plate 10 is disposed on the lower portions of the pillars 15 which are reduced in diameter from the upper portions, thereby forming a shoulder 26 on each pillar between the upper portion which may be hexagon in shape and the lower portion which may be round in shape.

A generally conical shaped compression spring 27 is disposed on each pillar 15 between the mounting plate 10 and the back wall of the cabinet 16. The springs 27 press the circuit interrupter units 12 upwardly against the shield 23 thereby causing the flange 24 on the shield to engage the trim 19. The position of the shield, with reference to the trim 19, may be adjusted by means of the screws 25 which are accessible through the doorway of the cabinet when the door 21 is opened. Thus, the shield may be adjusted with reference to the trim 19 after the basic structure is assembled in the cabinet and the trim 19 is placed on the cabinet, thereby adjusting for any unevenness in the wall in which the cabinet is installed. The upward movement of the upper ends of the springs 27 is limited by the shoulders 26 on the pillars 15. However, the openings in the plate 10 for the pillars 15 are of sufficient diameter to permit the plate 10 to be removed from the cabinet without removing the pillars 15.

Figure 10:
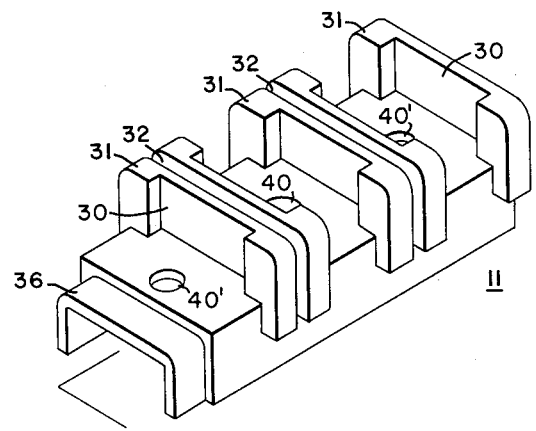
FIG. 10 is an isometric view of a portion of one of the insulating supports utilized in the panelboard structure.

As shown in FIG. 1, the center insulating supports 11 are mounted in end-to-end relation. As shown in FIGS. 4 and 10, each insulator support 11 is generally of an inverted U-shape in cross section. The support may be molded from any suitable insulating material. Each support is provided with a plurality of perpendicularly extending ribs 31 which have slots 32 therein to accommodate insulating barriers described hereinafter.

Figure 11:
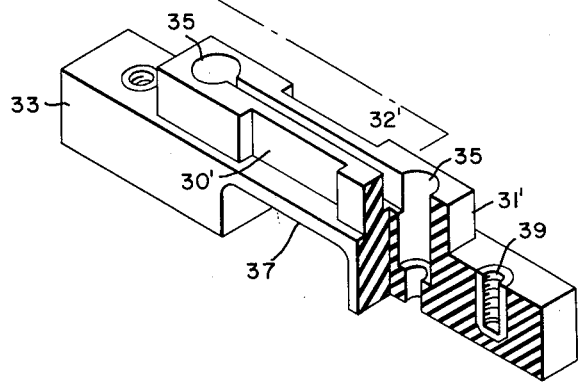
FIG. 11 is an isometric view of an insulating cross member utilized in the panelboard.
Figure 12:
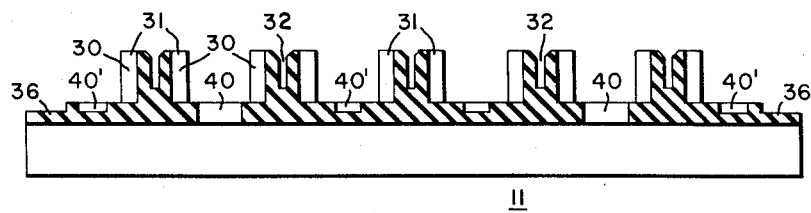
FIG. 12 is a view, in section, of the insulating support shown in FIG. 10.

The center supports 11 are retained in position on the base 10 by means of insulating cross members 33, one of which is shown in FIG. 11. Each cross member has a rib 31' with a slot 32' therein. The cross members 33 overlie the center supports 11, one cross member being disposed at each junction between two center supports and one cross member being provided at the lower end of the lower center support 11, as shown in FIG. 1. The cross members 33 may be attached to the base 10 by screws 34 which are inserted in openings 35 provided in the cross members. The upper portion of each opening 35 is enlarged to permit the head of the screw to be below the upper surface of the cross member, thereby increasing the arcing distance to other members.

As shown in FIGS. 10 and 11, the one end 36 of the center support 11 is reduced in size and this end fits into a U-shaped notch 37 in the cross member 33. The other end of the support, which is not shown in FIG. 10, is similar to the end 36 and fits into a notch in a cross member. In this manner, as many center supports and cross members as required may be provided to accommodate the desired number of circuit interrupter units in the panelboard structure. The center supports 11 may be manufactured in predetermined lengths and assembled in a panelboard in end-to-end relation with a cross member 33 provided at each junction between two adjacent center supports, thereby retaining the center supports in position.

Figure 8:
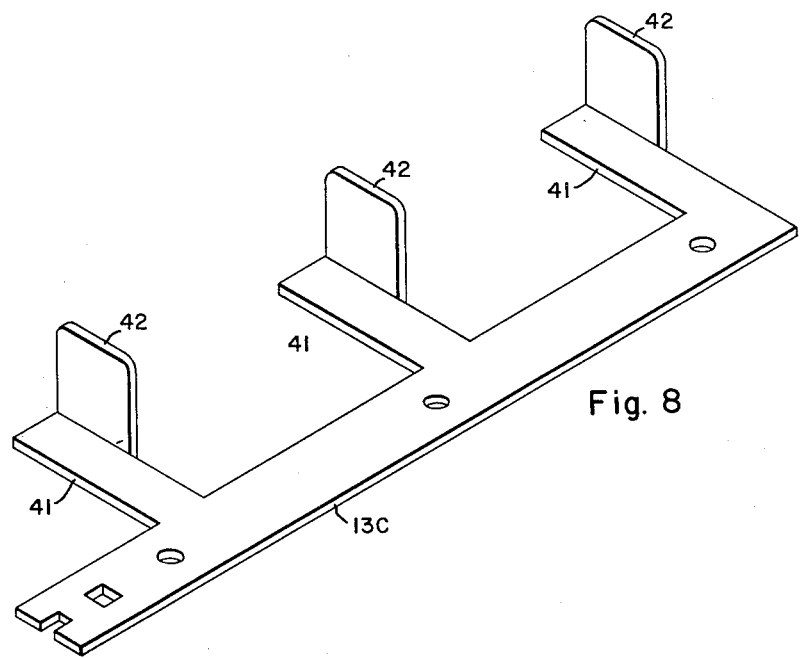
FIG. 8 is an isometric view of one of the bus bars utilized in the structure shown in FIG. 1.

As shown in FIGS. 1 and 4, the two outer bus bars 13A and 13C are mounted on top of the cross members 33. The bus bars are retained on the cross members 33 by screws 38 which are threaded into metal inserts 39 molded into the cross members 33. As shown in FIG. 8, each outer bus bar has transversely extending arms 41 with integrally formed contact portions 42 thereon. The contact portions 42 are disposed in recesses 30 in the ribs 31 on the support 11. The two outer bars 13A and 13C are similar in shape and they may be blanked from a single sheet of copper or other conducting material. The integral contact portions 42 are formed during the same operation that blanks out the bus bars.

Figure 9:
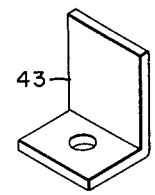
FIG. 9 is an isometric view of a contact portion which is attachable to the center bus bar utilized in the structure shown in FIG. 1.

The center bus bar 13B is a straight strip of copper. As shown in FIG. 4, it is mounted underneath the center supports 11 between the legs of the U-shaped portion of the supports. Angle-shaped contact portions 43, one of which is shown in FIG. 9, are mounted on top of the center supports 11 and are attached to the center bus bar 13B, by screws 44 which extend through plug connectors 45 and are threaded into the center bus bar thereby retaining the bus bar in position underneath the center supports. Each plug connector 45 is disposed in a hole 40 in a center support 11.

A terminal connector 46 may be attached at the lower end of each bus bar for connecting a line conductor to the bus bar. A neutral bar assembly 47, of a well-known type, may be mounted on an insulating support 48 at the upper end of the base 10. A terminal connector 49 is provided for connecting a neutral conductor to the neutral assembly 47. Thus, the present structure is suitable for a three-phase four-wire system. If the panelboard is to be utilized in a three-phase three-wire system, the neutral assembly may be omitted. If the panelboard is to be utilized in a single-phase three-wire or a three-wire D.C. system, the center bus bar may be omitted.

As previously explained, the circuit breakers shown in FIGS. 1 and 4 are of the plug-in type. The breakers are mounted on a metal support 51 and the ribs 31 of the center supports 11. The metal supports 51 extend parallel to the bus bars and are spaced from the center supports at the proper distance to accommodate the circuit breakers 12. Each metal support 51 has a plurality of integrally formed projections 52 thereon, one of which hooks into an opening provided in the housing for each circuit breaker unit. Each circuit breaker unit is provided with contact members or jaws which engage either the contact portion 42 of one of the outer bus bars or the contact portion 43 which is attached to the center bus bar as previously explained.

As shown in FIG. 1, the arms 41 of the outer bus bars terminate over the center supports 11 with the contact portions 42 and 43 being in alignment. Thus, the circuit breakers 12 may be assembled in the panelboard with the two upper breakers being connected to the lefthand outer bus bar or phase A. The next two circuit breakers are connected to the center bus bar or phase B and the next two are connected to the right-hand outer bus bar or phase C. The foregoing sequence of connections is then repeated proceeding downwardly in the panelboard.

Figure 2:
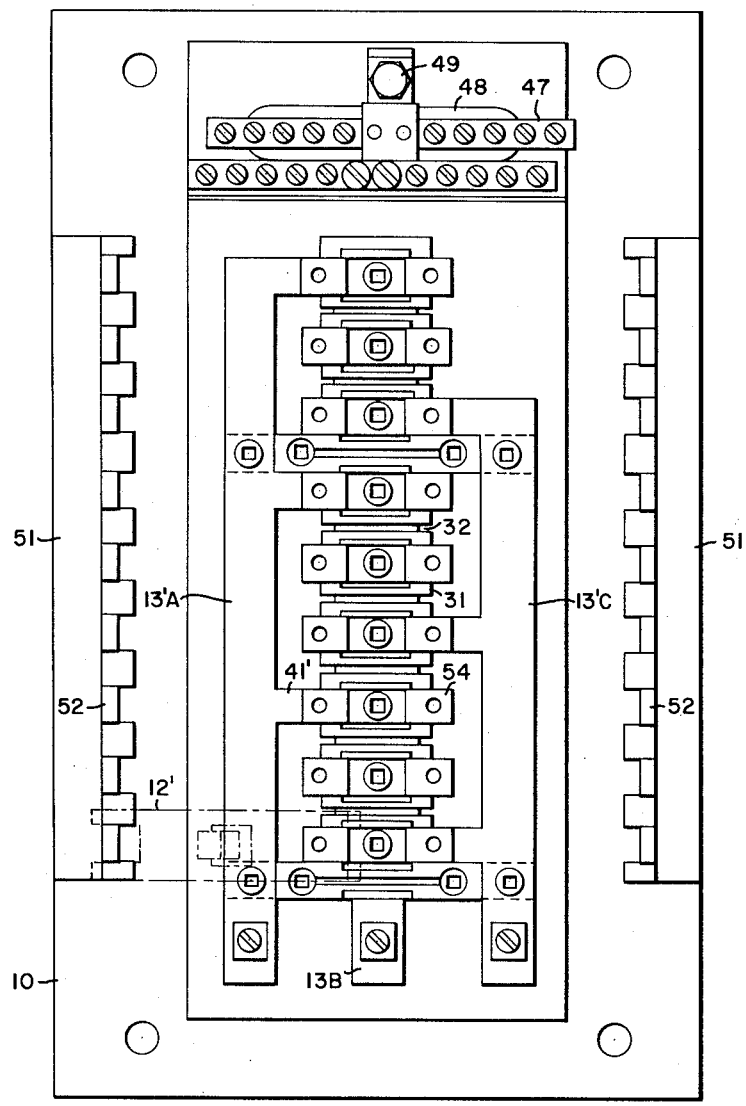
FIG. 2 is a view, in plan, of a modification of the structure shown in FIG. 1.
Figure 5:
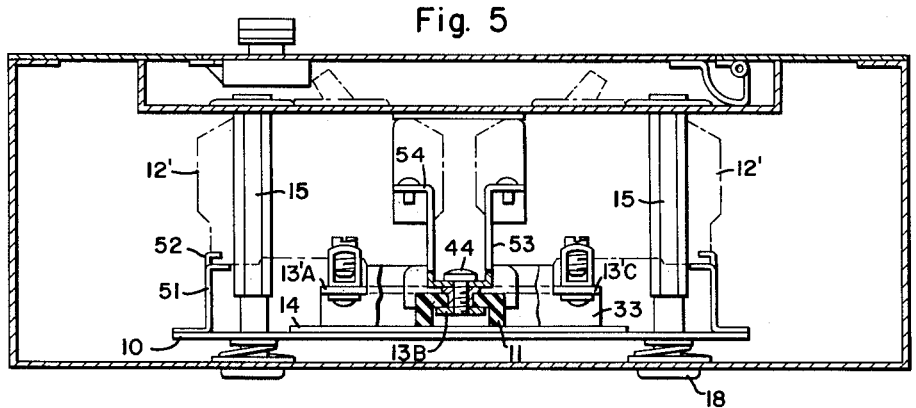
Figure 7:
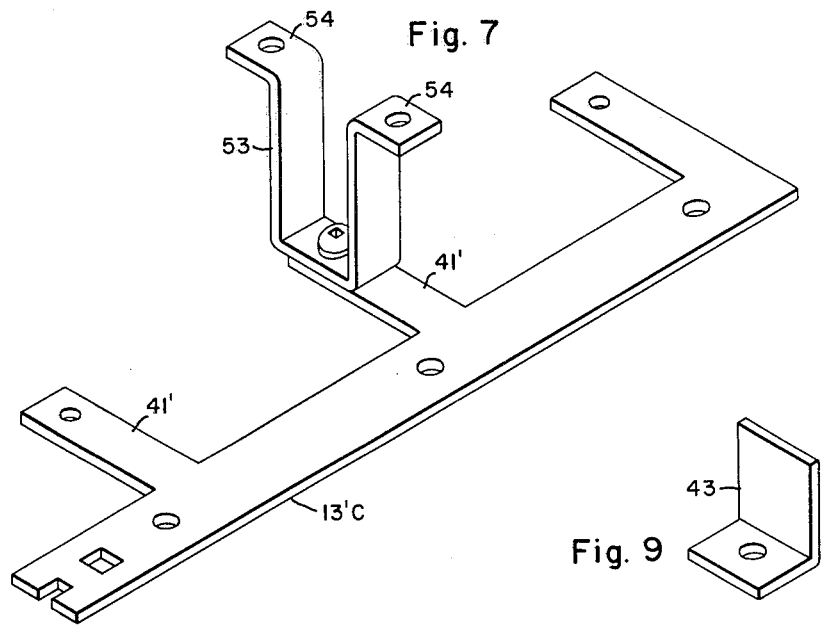
FIG. 7 is an isometric view of one of the bus bars utilized in the structure shown in FIG. 2.

The panelboard shown in FIGS. 2 and 5 is similar to the one shown in FIGS. 1 and 4 with the exception that the circuit breaker units 12' are of the bolted-on type instead of the plug-in type and the outer bus bars 13'A and 13'C are slightly different from the outer bus bars 13A and 13C. As shown in FIG. 7, each outer bus bar has a transverse arm 41' and a generally U-shaped connector 53 is attached to each arm 41' by a screw 50. The support 11 has recesses 40' therein for the lower ends of screws 50. As shown in FIG. 5, similar connectors 53 are attached to the center bus bar 13B by screws 44 and plug connectors 45. The upper ends of the legs of the connectors 53 have outwardly extending projections 54 thereon which are connected to terminals of the circuit breaker units 12'.

Since the housings for the circuit breaker units 12' are longer than the housings for the breaker units 12, the metal supports 51 are spaced further from the center supports 11. In this case, the metal supports 51 are attached at the outer edge of the base 10 with the breaker units 12' spanning a greater distance between the metal supports 51 and the center supports 11 than in the structure shown in FIGS. 1 and 4. However, the same supporting parts are utilized in the structure shown in FIGS. 2 and 5 as in the structure shown in FIGS. 1 and 4. Thus, the same supporting parts may be utilized for either a plug-in panelboard or a panelboard in which the circuit breakers are of the bolted-on type, thereby reducing the number of parts required in stock for assembling panelboards of both types.

Figure 3:
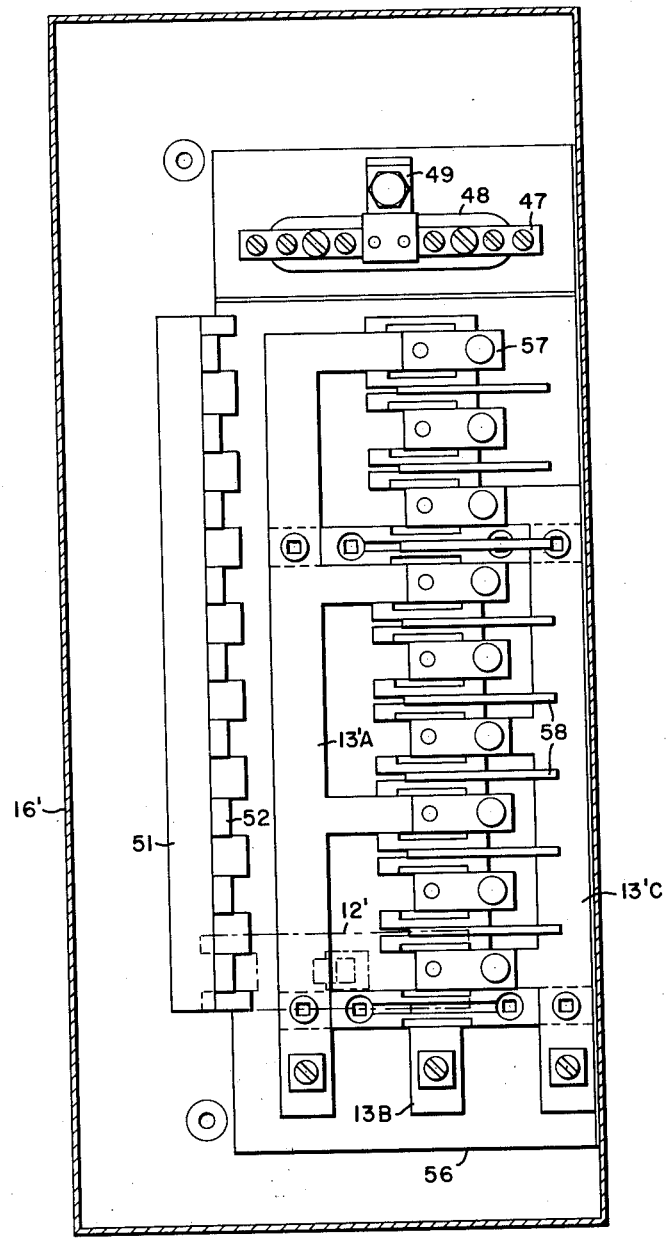
FIG. 3 is a view partly in plan, and partly in section, of another modification of the invention.
Figure 6:
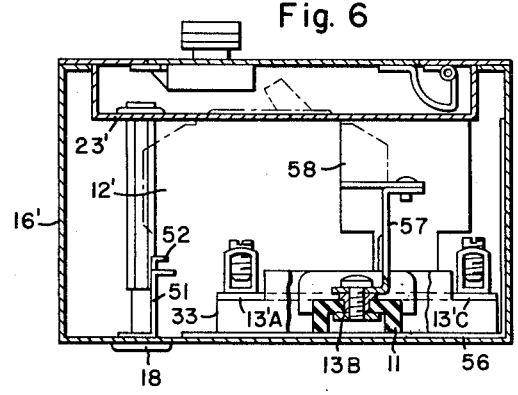

The panelboard shown in FIGS. 3 and 6 is of a narrow type having only a single row of circuit breaker units. This type is suitable for mounting between the flanges of steel beams in a building. The bus structure and supporting members are similar to the ones utilized in the structures previously described, except that the metal support 51 is mounted directly on the back wall of cabinet 16' and the insulating supports 11 and cross members 33 are mounted on the back wall with an angle-shaped piece of insulating paper 56 disposed between the insulating supports and the cabinet.

The bus structure is displaced to one side of the cabinet. The shield 23' is mounted on pillars in the manner previously described and the pillars serve to mount the shield as well as act as barriers to insure that cables inside the cabinet are held away from the main lugs of the bus structure. The circuit interrupter units are of the bolt-on type. They are connected to the bus bars by connectors 57 which are generally of an S-shape. Insulating barriers 58 are disposed in the slots 32 between the connectors 57 in the same manner that barriers are provided between the connectors 53. The bus bars utilized in this structure are similar to the bus bars utilized in the structures shown in FIGS. 2 and 5.

From the foregoing description, it is apparent that the invention provides a panelboard structure having a minimum number of contact surfaces which generate heat, thereby reducing the amount of heat which must be dissipated from the structure. The bus structures are of a simple form which may be blanked out from sheet material. The supporting members are of a simple repetitive structure, thereby enabling the mounting of any number of breakers within the panelboard without requiring individual supporting structures for the bus and the breaker units. The cross members perform the dual functions of supporting the bus bars and retaining the center supports in position. The supporting parts of the basic structure are the same for circuit breakers of the plug-in type as for circuit breakers of the bolted-on type. Thus, the number of parts required for assembling panelboards of both types is reduced.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a panelboard, in combination, a cabinet having a back wall and side walls, a trim member attached to the side walls, a door hinged on the trim member, supporting pillars having their lower ends attached to the back wall, a base movably mounted on the pillars, resilient means disposed on the pillars between the base and the back wall, circuit interrupter units removably mounted on the base, a shield attached to the upper ends of the pillars and supported by the pillars, means threaded into the upper ends of the pillars for compressing the shield against the interrupter units which are biased toward the shield by the resilient means, and said threaded means being accessible from in front of the shield for adjusting the position of the shield with reference to the trim member when the door is opened.

2. In a panelboard, in combination, a cabinet having a back wall and side walls, a trim member attached to the side walls, supporting pillars having their lower ends attached to the back wall, a base movably mounted on the pillars, resilient means disposed on the pillars between the base and the back wall, circuit interrupter units removably mounted on the base, a shield attached to the upper ends of the pillars, and supported by the pillars means threaded into the upper ends of the pillars for compressing the shield against the interrupter units which are biased toward the shield by the resilient means, said threaded means being accessible from in front of the shield for adjusting the position of the shield with reference to the trim member, and said interrupter units being removable from the base by removing the trim member from the cabinet and the shield from the pillars.

3. In a panelboard, in combination, a cabinet having a back wall and side walls, a plurality of insulating supports disposed in the cabinet in end-to-end relation, each support having generally an inverted U-shaped cross section, a separate insulating cross member disposed at each junction of adjacent supports, said cross member overlying and engaging the adjacent ends of the supports to retain them in position and extending beyond the side of the supports, a bus bar extending between the legs of the supports and attached to the bases of the supports, additional bus bars attached to the cross members, a metal support extending parallel to the bus bars and spaced from the insulating supports, a plurality of circuit interrupters mounted on the metal support and the insulating supports, and each circuit interrupter being electrically connected to one of said bus bars.

4. In a panelboard, in combination, a cabinet having a back wall and side walls, a plurality of insulating supports disposed in the cabinet in end-to-end relation, each support having generally an inverted U-shaped cross section, a separate insulating cross member attached to the base at each junction of adjacent supports, said cross member overlying the adjacent ends of the supports to retain them in position, parallel bus bars disposed on top of the cross members and attached to the cross members, a metal support extending parallel to the bus bars and attached to the base at a distance from the insulating supports, a plurality of circuit interrupter units spanning the distance between the metal support and the insulating supports, and each circuit interrupter unit being supported by the meal support and an insulating support and electrically connected to a bus bar.

5. In a panelboard, in combination, a cabinet having a back wall and side walls, a trim member attached to the side walls, supporting pillars having their lower ends attached to the back wall, a base movably mounted on the pillars, a plurality of insulating supports disposed on the base in end-to-end relation, each support having generally an inverted U-shaped cross section, a separate insulating cross member attached to the base at each junction of adjacent supports, said cross member overlying the adjacent ends of the supports to retain them in position, parallel bus bars disposed on top of the cross members and attached to the cross members, a metal support extending parallel to the bus bars and attached to the base at a predetermined distance from the insulating supports, a plurality of enclosed circuit interrupter units spanning the distance between the metal support and the insulating supports, and each circuit interrupter being electrically connected to a bus bar.

6. In a panelboard, in combination, a cabinet having a back wall and side walls, a trim member attached to the side walls, supporting pillars having their lower ends attached to the back wall, a base movably mounted on the pillars, a plurality of insulaitng supports disposed on the base in end-to-end relation, a separate insulating cross member attached to the base at each junction of adjacent supports, said cross member overlying the adjacent ends of the supports to retain them in position, parallel bus bars disposed on top of the cross members and attached to the cross members, a metal support extending parallel to the bus bars and attached to the base at a predetermined distance from the insulating supports, a plurality of enclosed circuit interrupter units spanning the distance between the metal support and the insulating supports, and connectors for electrically connecting each circuit interrupter to a bus bar.

7. In a panelboard, in combination, a cabinet having a back wall and side walls, supporting pillars having their lower ends attached to the back wall, a base movably mounted on the pillars, a plurality of insulating supports disposed on the base in end-to-end relation, a separate insulating cross member attached to the base at each junction of adjacent supports, said cross member overlying the adjacent ends of the supports to retain them in position, parallel bus bars disposed on top of the cross members and attached to the cross members, transverse extensions on the bus bars, said extensions terminating over the insulating supports, a metal support extending parallel to the bus bars and attached to the base at a predetermined distance from the insulating supports, a plurality of enclosed circuit interrupter units spanning the distance between the metal support and the insulating supports, and each circuit interrupter being electrically connected to one of the extensions on the bus bars.

8. In a panelboard, in combination, a cabinet having a back wall and side walls, supporting pillars having their lower ends attached to the back wall, a base movably mounted on the pillars, a plurality of insulating supports disposed on the base in end-to-end relation, each support having generally an inverted U-shaped cross section, a separate insulating cross member disposed at each junction of adjacent supports, said cross member overlying and engaging the adjacent ends of the supports to retain them in position and extending beyond the sides of the supports, a bus bar extending between the legs of the supports and attached to the bases of the supports, additional bus bars attached to the cross members, transverse extensions on the additional bus bars, said extensions terminating over the insulating supports and having integrally formed contact portions thereon, a metal support extending parallel to the bus bars and spaced from the insulating supports, a plurality of circuit interrupters mounted on the metal support and the insulating supports, contact portions attached to the bus bar disposed between the legs of the insulating supports, and each circuit interrupter having contact members engaging one of said contact portions on the bus bars.

9. In a panelboard, in combination, a cabinet having a back wall and side walls, a plurality of insulating supports disposed in the cabinet in end-to-end relation, each support having generally an inverted U-shaped cross section, a separate insulating cross member disposed at each junction of adjacent supports, said cross member overlying and engaging the adjacent ends of the supports to retain them in position and extending beyond the sides of the supports, a bus bar extending between the legs of the supports and attached to the bases of the supports, additional bus bars attached to the cross members, transverse extensions on the additional bus bars, said extensions terminating over the insulating supports, a metal support extending parallel to the bus bars and spaced from the insulating supports, a plurality of circuit interrupters mounted on the metal support and the insulating supports, and each circuit interrupter being electrically connected to one of said bus bars.

10. In a panelboard, in combination, a cabinet having a back wall and side walls, a plurality of insulating supports disposed in the cabinet in end-to-end relation, each support having generally an inverted U-shaped cross section, a separate insulating cross member disposed at each junction of adjacent supports, said cross member overlying and engaging the adjacent ends of the supports to retain them in position and extending beyond the sides of the supports, a bus bar extending between the legs of the supports and attached to the bases of the supports, additional bus bars attached to the cross members, transverse extensions on the additional bus bars, said extensions terminating over the insulating supports, said additional bus bars having integrally formed contact portions on the transverse extensions, a metal support extending parallel to the bus bars and spaced from the insulating supports, a plurality of circuit interrupters mounted on the metal support and the insulating support, and said circuit interrupters having contact members engaging contact portions on the bus bars.

11. In a panelboard, in combination, a cabinet, a plurality of insulating supports disposed in the cabinet in end-to-end relation, each support having generally an inverted U-shaped cross section, a separate insulating cross member disposed at each junction of adjacent supports, said cross member overlying and engaging the adjacent ends of the supports to retain them in position and extending beyond the sides of the supports, a bus bar extending between the legs of the supports and attached to the bases of the supports, additional bus bars attached to the cross members, transverse extensions on the additional bus bars, and said extensions terminating over the insulating supports.

12. An elongated insulating support having generally an inverted U-shaped cross section, taken transversely of the longest dimension of the support, a plurality of integrally formed spaced ribs extending perpendicularly from the base of the U-shaped portion and disposed transversely of the support, a slot in each rib extending transversely of the support, a recess in at least one face of each rib, and each end of the U-shaped portion of the support being reduced in size.

References Cited in the file of this patent

UNITED STATES PATENTS

| | | |
|---|---|---|
| 1,994,509 | Frank | Mar. 19, 1935 |
| 2,138,408 | Rowe | Nov. 29, 1938 |
| 2,737,613 | Morris | Mar. 6, 1956 |
| 2,739,272 | Norden | Mar. 20, 1956 |
| 2,790,113 | Brown | Apr. 23, 1957 |
| 2,823,339 | Locher | Feb. 11, 1958 |
| 2,871,284 | Wills | Jan. 27, 1959 |
| 2,880,263 | Hermann | Mar. 31, 1959 |
| 2,902,632 | Stanback | Sept. 1, 1959 |
| 2,914,708 | Edmunds | Nov. 24, 1959 |